United States Patent
Olgaard et al.

(10) Patent No.: US 6,683,919 B1
(45) Date of Patent: Jan. 27, 2004

(54) METHOD AND APPARATUS FOR NOISE BANDWIDTH REDUCTION IN WIRELESS COMMUNICATION SIGNAL RECEPTION

(75) Inventors: Christian Volf Olgaard, Sunnyvale, CA (US); Gerard Socci, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/334,077

(22) Filed: Jun. 16, 1999

(51) Int. Cl.$^7$ ................................................ H03K 9/00
(52) U.S. Cl. ...................... 375/316; 375/285; 375/350; 455/63.1; 455/296
(58) Field of Search ................................ 375/285, 316, 375/346, 350, 354, 377, 340; 455/343.1–343.6, 130, 266, 63.1, 296, 307, 501; 333/173

(56) References Cited

U.S. PATENT DOCUMENTS

| | | | |
|---|---|---|---|
| 4,319,207 A | * 3/1982 | Gignoux | 333/173 |
| 5,052,027 A | 9/1991 | Poklemba et al. | 375/350 |
| 5,216,696 A | 6/1993 | Poklemba | 375/346 |
| 5,285,470 A | 2/1994 | Schreiber | 348/384.1 |
| 5,561,667 A | 10/1996 | Gerlach | 370/286 |
| 5,596,605 A | 1/1997 | Kiyanagi et al. | 375/326 |
| 5,659,586 A | 8/1997 | Chun | 375/355 |
| 5,678,227 A | * 10/1997 | Connell et al. | 455/343 |
| 5,680,143 A | 10/1997 | Hershey et al. | 342/375 |
| 5,703,597 A | 12/1997 | Yu et al. | 342/357.12 |
| 5,710,862 A | 1/1998 | Urbanski | 704/226 |
| 5,742,635 A | 4/1998 | Sanderford, Jr. | 375/149 |
| 5,761,243 A | 6/1998 | Russell et al. | 375/233 |
| 5,764,686 A | 6/1998 | Sanderford et al. | 375/149 |
| 6,047,171 A | * 4/2000 | Khayrallah et al. | 455/266 |
| 6,385,262 B1 | * 5/2002 | Gustafsson et al. | 375/350 |

* cited by examiner

*Primary Examiner*—Chieh M. Fan
(74) *Attorney, Agent, or Firm*—Girard & Equitz LLP (57) ABSTRACT

A wireless communication system (e.g., GSM) receiver including analog (e.g., analog channel select) and digital filters, and bandwidth control circuitry which operates during at least one mode (e.g., a synchronization mode) to effectively narrow the combined pass band of the analog and digital filters thus reducing the bandwidth of noise passing therethrough, and a method for reducing noise pass band (preferably by data rotation) in at least one mode (e.g., a synchronization mode) but not all modes of wireless communication system receiver. Preferably,the bandwidth control circuitry passes through the output of an analog-to-digital converter (indicative of data) to the digital filter during at least one operating mode, and the bandwidth control circuitry rotates the data in the complex domain (during at least one other mode) before the data is digitally filtered. Rotation of the data is equivalent to rotation of the digital filter pass band, so that (during synchronization) the combined pass band of the analog and digital filters is effectively narrowed but is still sufficiently wide to include the frequency of a frequency correction burst. By performing data rotation in the complex domain, noise bandwidth reduction can be accomplished with simple logic circuitry configured to perform simple logic operations.

38 Claims, 7 Drawing Sheets

METHOD AND APPARATUS FOR NOISE BANDWIDTH REDUCTION IN WIRELESS COMMUNICATION SIGNAL RECEPTION

FIELD OF THE INVENTION

The present invention relates generally to methods and apparatus for reducing noise bandwidth in a wireless communication receiver. In preferred embodiments, the invention is a GSM receiver including a channel select filter, analog-to-digital converter, digital filter, and circuitry (operable during synchronization with a transmitter) to reduce the effective combined pass band of the channel select and digital filters, thereby reducing noise bandwidth during synchronization.

DESCRIPTION OF THE RELATED ART

In many contexts in which a signal is received after propagating over a transmission link, the receiver is typically implemented in one of two ways. In one such receiver implementation, the received signal is bandpass filtered, then undergoes frequency conversion followed by analog-to-digital conversion and digital filtering (including digital bandpass filtering to reduce noise), and then undergoes a sequence of further processing operations (at least one of the operations being performed on different frequency band of the filtered digitized signal than is another of the operations). In the other receiver implementation, the received signal is bandpass filtered, then undergoes analog-to-digital conversion followed by frequency conversion, decimation and digital filtering (including digital bandpass filtering to reduce noise), and then undergoes a sequence of further processing operations (at least one of the operations being performed on different frequency band of the filtered digitized signal than is another of the operations).

For example, in typical wireless communication systems a receiver performs filtering (including channel selection) on a received signal, thereby generating an intermediate signal. The intermediate signal is a modulated signal (e.g., a signal modulated by Gaussian minimum shift keying) which must undergo further demodulation to extract its information content. Typically, the intermediate signal undergoes down conversion to the baseband followed by analog-to-digital conversion. The resulting digitized signal is then digitally filtered to reduce noise (thereby generating a filtered digital signal) prior to further processing (e.g., demodulation). If the received signal (and thus the filtered digital signal) is time-division-multiplexed (its data being contained in a specific time slot relative to the start of each frame transmitted by the transmitting system), the receiver must perform an initial synchronization operation in which it processes an initial portion of the filtered digital signal so as to synchronize itself with the transmitting system. Typically, the synchronization frames of the filtered digital signal contain a tone of known frequency which the receiver must lock onto in order to perform the synchronization. After the synchronization has been completed, the receiver enters a mode in which it demodulates the normal transmitted data of the filtered digital signal.

One conventional type of TDMA (time division multiple access) wireless communication system is the GSM system, which uses both FDMA (frequency division multiple access) and TDMA. In a GSM system, each signal is transmitted in a selected frequency channel (the carriers being spaced 200 kHz apart from each other) in the range from 880–915 MHz (for transmission) to 925–960 MHz (for reception). Eight users can share each frequency channel, since eight time-domain-multiplexed channels are transmitted within each frequency channel. Each transmitted signal comprises frames of data. The users that share a single frequency channel access different non-overlapping time intervals of each frame transmitted in that frequency channel (in round-robin fashion). Thus, each receiving system includes a bandpass filter to select a frequency band, as well as synchronization circuitry (for synchronizing with the transmitter) so that the receiving system can select the proper time slot of the time-domain-multiplexed signal in the selected frequency band.

Figure 1A:
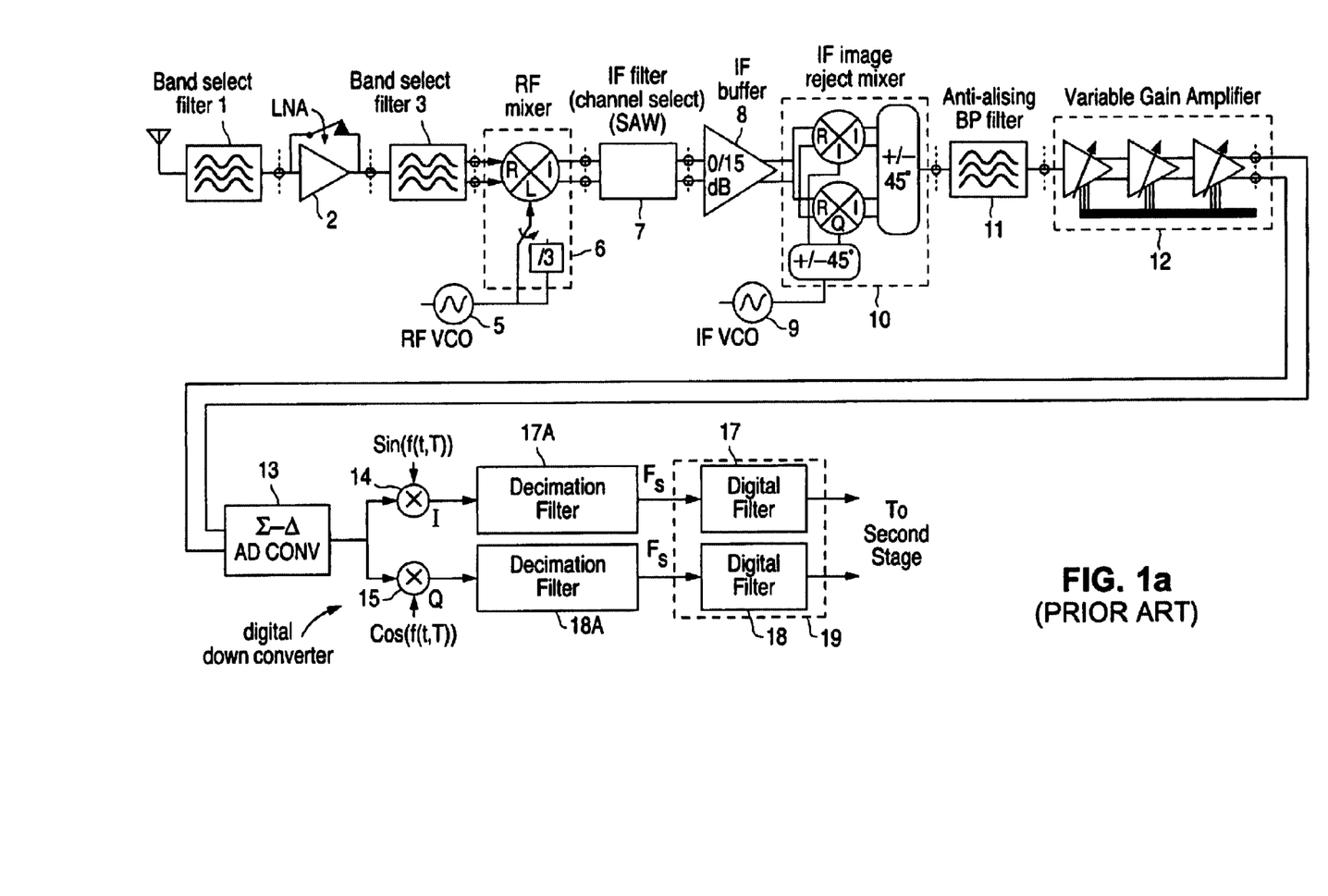
FIG. 1a is a block diagram of a portion of a receiver of a conventional GSM wireless communication system.

FIG. 1a is a block diagram of a portion of a receiver of a conventional GSM wireless communication system. In the GSM receiver of FIG. 1a, the signal received by filter 1 (which has been transmitted over a wireless communication link) has a carrier frequency in the range is 925 MHz to 960 MHz. The received signal is bandpass filtered in filter 1, amplified in low-noise amplifier 2, and again bandpass filtered in filter 3. The signal is then mixed (in RF mixer 6) with an RF signal (from voltage controlled oscillator 5) having frequency much lower than the 925–960 MHz carrier frequency, and the resulting intermediate frequency signal is bandpass filtered in channel select filter 7. The pass band of filter 7 is centered so that filter 7 selects a particular one of the GSM carrier frequencies (which as noted above are spaced 200 kHz apart from each other), and has width A, where A is less than 200 kHz but much greater than. 67 kHz.

The output of filter 7 is amplified in IF buffer amplifier 8, and then undergoes IF image rejection processing in mixer 10 (which receives an intermediate frequency signal from voltage controlled oscillator 9) and bandpass filtering (for antialiasing) in bandpass filter 11. The analog signal output from filter 11 is amplified in variable gain amplifier 12, and then digitized in analog-to-digital converter 13 (which is typically a sigma-delta analog-to-digital converter).

The digital signal output from A-to-D converter 13 then undergoes mixing in mixers 14 and 15, to generate an in-phase component I and a quadrature component Q (each of the components I and Q having a sample rate higher than the standard GSM data rate of 270.8 kb/sec). Mixer 14 typically mixes the output of converter 13 with a signal proportional to $\sin(\pi t/2T)$, where $1/T$ is equal to four times the second intermediate frequency, and mixer 15 typically mixes the output of converter 13 with a signal proportional to $\cos(\pi t/2T)$.

Mixers 14 and 15 perform digital "down conversion" (to the baseband) and generate the in-phase component (I) and the quadrature component (Q). Decimation filter 17A performs noise filtering and downsampling on the in-phase component (I). Decimation filter 18A performs noise filtering and downsampling on the quadrature component (Q). Typically, filter 17A is identical to filter 18A.

Digital filter 17 performs final channel selection filtering of the down-converted, in-phase component I (asserted at the output of filter 17A) including by lowpass filtering it with a bandwidth of width B (where "B" is typically slightly less than above-mentioned width "A" of filter 7's pass band but much greater than 67 kHz), to produce a digitally filtered in-phase component. Digital filter 18 performs final channel selection filtering of the down-converted, quadrature component Q (asserted at the output of filter 18A), including by lowpass filtering it with a bandwidth of width B, to produce a digitally filtered quadrature component. Typically, filter 17 is identical to filter 18. Digital filters such as filters 17 and 18 that are used in wireless communication receivers typically perform filtering in addition to lowpass filtering, but we will refer to them herein as digital lowpass filters. Specifically, we will refer to each of filters 17 and 18 as a digital lowpass filter, and to filters 17 and 18 collectively as digital lowpass filter 19 (indicated in FIG. 1a).

Figure 1B:
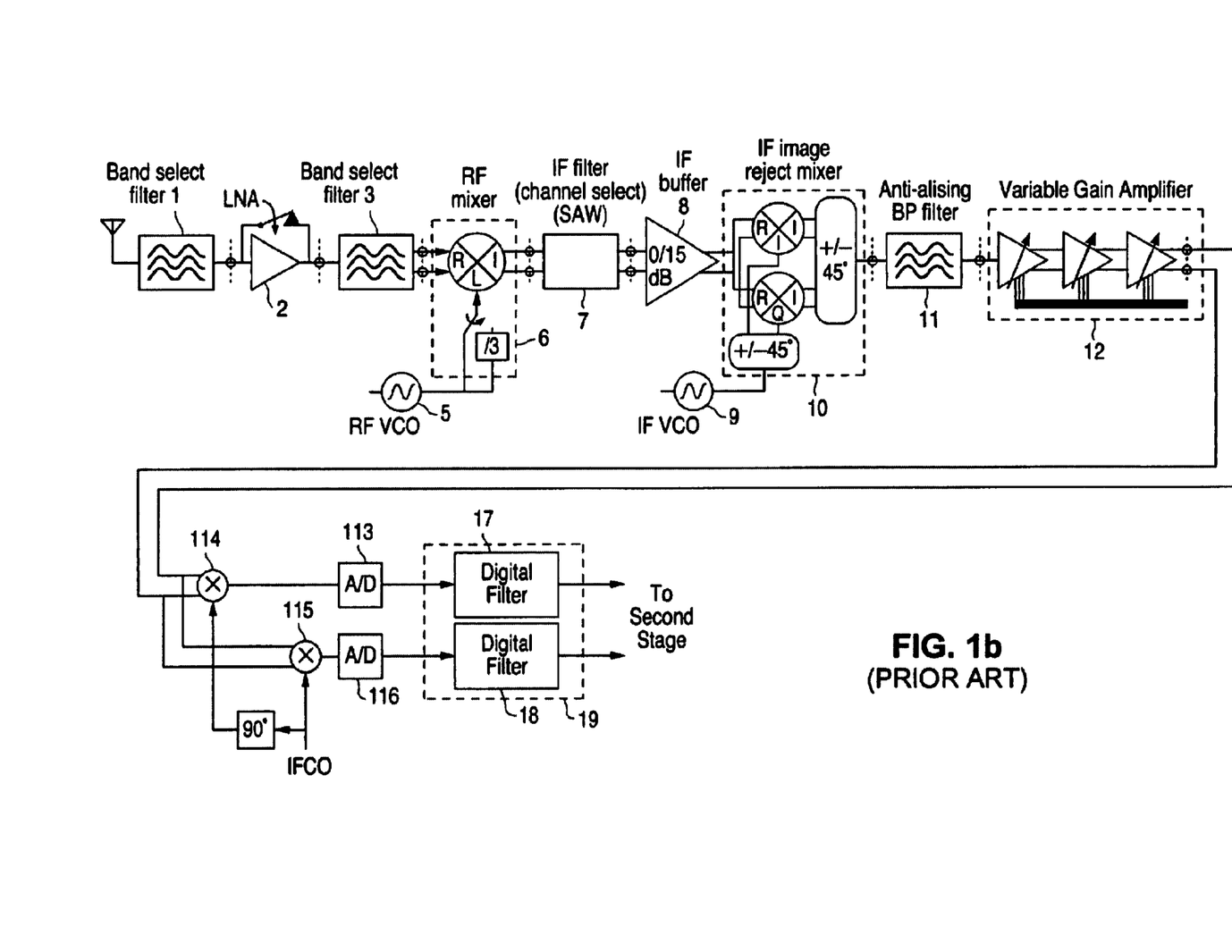
FIG. 1b is a block diagram of a portion of a another type of receiver used in a conventional GSM wireless communication system.

FIG. 1b is a block diagram of a portion of another conventional receiver used in conventional GSM wireless communication systems. The GSM receiver of FIG. 1b is identical to that of FIG. 1a, except in that mixers 114 and 115, analog-to digital converters 113 and 116 (of FIG. 1b) replace analog-to digital converter 13, mixers 14 and 15, and decimation filters 17A and 18A (of FIG. 1a). Components of the FIG. 1b receiver that correspond to components of the FIG. 1a receiver are identically numbered in FIGS. 1a and 1b and the description of them will not be repeated.

In FIG. 1b, the amplified analog signal output from variable gain amplifier 12 undergoes mixing in mixers 114 and 115, to generate an in-phase component I and a quadrature component Q. Mixer 114 typically mixes the output of amplifier 12 with a signal proportional to $\sin(\pi t/2T)$, where $1/T$ is the data rate, and mixer 115 typically mixes the output of amplifier 12 with a signal proportional to $\cos(\pi t/2T)$.

Then, the in-phase component (I) output from mixer 114 is digitized (with baseband sampling) in analog-to-digital converter 113, and the quadrature component (Q) output from mixer 115 is digitized (with baseband sampling) in analog-to-digital converter 116.

Digital filter 17 filters the digitized in-phase component I (asserted at the output of converter 113) including by lowpass filtering it with a bandwidth of width B (where "B" is typically slightly less than above-mentioned width "A" of filter 7's pass band but much greater than 67 kHz), to produce a digitally filtered in-phase component. Digital filter 18 filters the digitized quadrature component Q (asserted at the output of converter 116), including by lowpass filtering it with a bandwidth of width B, to produce a digitally filtered quadrature component.

There exist other receivers which are similar to those of FIGS. 1a and 1b, but which employ only one intermediate frequency stage (or no intermediate frequency stage). Such receivers deliver a signal (or signals) to an analog-to-digital converter (e.g., to converter 13 of FIG. 1a) or to analog-to-digital converters (e.g., converters 113 and 116 of FIG. 1b).

In both the FIG. 1a and FIG. 1b implementations of conventional receivers, the digitally filtered in-phase and quadrature components output from filter 19 undergo further processing (by second stage receiver circuitry not shown). In performing such further processing, the receiver typically operates in a sequence of modes: a synchronization mode in which it processes an initial synchronization burst (sometimes referred to herein as a frequency correction burst) of one or both of the filtered in-phase and quadrature components to synchronize itself with the transmitting system; and then a normal mode in which it demodulates data (i.e., to extract the transmitted information content of the filtered in-phase and quadrature components). If the frequency correction burst cannot be identified during the synchronization mode (e.g., when the signal is too weak), the call cannot be established.

The pass bands of filters 7 and 19 are aligned with respect to the carrier center frequency (at least roughly), but that of filter 7 is usually slightly wider than that of filter 19 (and thus that of filter 17 or 18), so that digital lowpass filter 19 provides additional selectivity. However, the combined pass band of filters 7 and 19 is broader than necessary to accomplish the initial frequency synchronization operation. This is because the initial synchronization burst is a single frequency tone whose frequency is 67 kHz above the receiver's channel frequency (i.e., 67 kHz above the center of the 200 kHz-wide band allocated to the receiver in the 925 MHz-to-960 MHz GSM range). Before synchronization is accomplished, the crystal oscillator circuitry in the receiver will not have the exact frequency of the tone burst, and will instead typically be too high or low by as much as about 10 ppm (10 kHz too high or low). Thus, the synchronization circuitry in the receiver typically must seek the tone burst in a 20 kHz bandwidth. This bandwidth is much narrower than the typical signal bandwidth which the receiver accommodates during post-synchronization processing.

Thus, it would be desirable to implement the FIG. 1a (or 1b) circuit with a variable combined pass band for filters 7 and 19: a narrow combined pass band during synchronization (to improve the signal to noise ratio and thus allow easier synchronization, so that a call can be initiated more rapidly and reliably); and a wider combined pass band for post-synchronization processing (once synchronization has been established).

More generally (in contexts other than GSM reception as described with reference to FIGS. 1a and 1b), the invention pertains to systems in which a received signal undergoes initial (passive) bandpass filtering, then analog-to-digital conversion, then digital lowpass (or bandpass) filtering to reduce noise, and then a sequence of processing operations are performed on the filtered digitized signal (at least a first one of the operations being performed on a narrower frequency band of the filtered digitized signal than are the other ones of the operations). In such systems, it would be desirable to narrow (or effectively narrow) the combined pass band of the passive bandpass and digital lowpass (or passive bandpass and digital bandpass) filters during the first one of the operations (for improved signal to noise ratio) and to widen (or effectively widen) their combined pass band during the other operations, preferably without varying any characteristic of the digital lowpass (or digital bandpass) filter.

However, until the present invention it had not been known how to implement such a variable combined pass band by modifying conventional circuitry (in a minor respect) to include simple bandwidth control circuitry, but without modifying any of the digital filters conventionally used in the conventional circuitry.

SUMMARY OF THE INVENTION

In preferred embodiments, the invention is a GSM receiver including a passive analog filter (a bandpass or lowpass filter) such as a passive channel select filter, an analog-to-digital converter, a digital filter (whose functions include a lowpass or bandpass filtering function), and bandwidth control circuitry (operable during a synchronization mode) configured to effectively narrow the combined pass band of the analog and digital filters (so as to reduce the bandwidth of noise that passes through both the analog and digital filters). In some preferred embodiments, the analog-to-digital converter includes sigma-delta conversion circuitry, digital down conversion circuitry, and a complex decimation filter. In other preferred embodiments, the analog-to-digital converter includes an analog down converter, and analog-to-digital conversion circuitry which samples the output of the analog down converter. Preferably, the bandwidth control circuitry receives the output of the analog-to-digital converter, and passes through such output (without changing it) to the digital filter during operating modes other than the synchronization mode. Also preferably, the output of the analog-to-digital converter is indicative of data, and the bandwidth control circuitry rotates the data in the complex domain (during the synchronization mode) before the data undergoes digital filtering. Frequency rotation of the data is equivalent to rotation of the digital filter pass band, so that (during synchronization) the combined pass band of the analog and digital filters is effectively narrowed but is still sufficiently wide to include the frequency of the frequency correction burst. By performing frequency rotation of the data in the complex (I-Q) domain, the invention accomplishes noise bandwidth reduction (during the synchronization mode) with very simple logic circuitry configured to perform simple logic operations. By implementing the bandwidth control circuitry as circuitry for performing frequency rotation on the data in accordance with the invention, conventional (unmodified) digital filters can be used.

Preferably, the bandwidth control circuitry is a data rotation circuit including two multiplexers, each coupled to receive the in-phase (I) and quadrature (Q) components of the data and negated versions thereof. At the output of each multiplexer, a different sequence of the inputs is asserted cyclically in response to a repeating sequence of control signal values. For example, one multiplexer asserts at its output (as the in-phase component of the rotated data) the repeating sequence I, Q, –I, and –Q in response to assertion (at twice the data rate) of a sequence of control signal values, while the other multiplexer asserts at its output (as the quadrature component of the rotated data) the repeating sequence Q–I, –Q, and I in response to the same sequence of control signal values. In a GSM receiver, the standard data rate is 270.8 kb/sec. The frequency rotation (on the data) by the multiplexers is equivalent to rotation of the digital filter pass band by (–270.8 kHz)/2=–135.4 kHz relative to a fixed pass band of the passive analog filter.

In another class of embodiments, the invention is a wireless communication system receiver (other than a GSM receiver) having a first stage including a passive analog filter (e.g., a passive channel select filter), an analog-to-digital converter, a digital filter, and selectively operable bandwidth control circuitry. The receiver also includes a second stage which receives the output of the first stage and performs a sequence of signal processing operations thereon, at least one of the signal processing operations being performed on a different frequency band of the first stage output than is another of such operations. The bandwidth control circuitry operates during at least one of the signal processing operations to reduce the effective combined pass band of the channel select and digital filters, thereby reducing the bandwidth of noise passed through to the second stage (during the at least one signal processing operation). Preferably, the output of the analog-to-digital converter is indicative of data, the bandwidth control circuitry is configured to rotate the data in the complex domain (during the at least one signal processing operation) before the data undergoes digital filtering, and at other times to pass through the data (without changing it) to the second stage.

Another aspect of the invention is a method for processing a signal that has propagated over a wireless communication link using a system having a first stage including an analog channel select filter (or other analog filter) and a digital filter (the analog and digital filters having a combined pass band) and a second stage, wherein the first stage provides a twice filtered signal (which has undergone filtering in both the analog filter and digital filter) to the second stage, and the second stage performs a sequence of operations on different portions of the twice filtered signal (e.g., a first operation on a portion of the twice filtered signal generated during a first time interval, and a second operation on a portion of the twice filtered signal generated during a later time interval). Each of the analog and digital filters is a low pass or bandpass filter, and the analog and digital filters together have a pass band (referred to as the "combined pass band"). In some embodiments, the method includes the steps of: (a) filtering a portion of the signal in the analog filter to generate a portion of a filtered signal, digitizing the portion of the filtered signal to produce a portion of a digitized filtered signal having in-phase and quadrature components, digitally processing the portion of the digitized filtered signal to generate a portion of a second signal, filtering the portion of the second signal in the digital filter to produce a portion of the twice filtered signal having a first noise bandwidth, and performing one of the operations in the second stage on said portion of the twice filtered signal; and (b) filtering a different portion of the signal in the analog filter to generate a different portion of the filtered signal, digitizing the different portion of the filtered signal to generate a different portion of the digitized filtered signal, filtering the different portion of the digitized filtered signal in the digital filter to produce a different portion of the twice filtered signal having a second noise bandwidth which is wider than the first noise bandwidth. Step (b) can be performed either before or after step (a), but the parameters of the analog filter are identical in steps (a) and (b) and the parameters of the digital filter are identical in steps (a) and (b). Preferably, the digital processing performed (on the digitized filtered signal) in step (a) is a data rotation operation.

In other embodiments, the method includes the steps of: (a) performing one of the operations in the second stage on a first portion of the twice filtered signal contemporaneously with filtering a portion of the signal in the analog filter to generate a filtered signal, digitizing said portion of the filtered signal to generate a portion of a digitized filtered signal, digitally processing the portion of the digitized filtered signal to generate a portion of a second filtered signal, and filtering the portion of the second filtered signal in the digital filter to produce a portion of the twice filtered signal having a first noise bandwidth; and (b) performing another one of the operations in the second stage on the twice filtered signal contemporaneously with filtering a different portion of the signal in the analog filter to generate a different portion of the filtered signal, digitizing the different portion of the filtered signal to generate a different portion of the digitized filtered signal, and filtering the different portion of the digitized filtered signal in the digital filter to produce a different portion of the twice filtered signal having a second noise bandwidth which is wider than the first noise bandwidth. Step (b) can be performed either before or after step (a), but the parameters of the analog filter are identical in steps (a) and (b) and the parameters of the digital filter are identical in steps (a) and (b).

In another class of embodiments, the method includes the steps of: (a) performing a first processing operation on a portion of the signal to generate a portion of a frequency down-converted signal having in-phase and quadrature components (this step can include immediate down conversion to a baseband frequency, or down conversion to an intermediate frequency); (b) filtering a portion of the frequency down-converted signal in the analog filter to generate a portion of a filtered signal, digitizing the portion of the filtered signal to generate a portion of a digitized filtered signal, digitally processing the portion of the digitized filtered signal to generate a portion of a second signal, and filtering the portion of the second signal in the digital filter to generate a portion of the twice filtered signal having a first noise bandwidth, and performing one of the operations on said portion of the twice filtered signal in the second stage; (c) performing the first processing operation on a different portion of the signal to generate a different portion of the frequency down-converted signal; and (d) filtering a different portion of the frequency down-converted signal in the analog filter to generate a different portion of the filtered signal, digitizing the different portion of the filtered signal to generate a different portion of the digitized filtered signal, and filtering the different portion of the digitized filtered signal in the digital filter to generate a different portion of the twice filtered signal having a second noise bandwidth which is wider than the first noise bandwidth, and performing another one of the operations on said different portion of the twice filtered signal in the second stage. In embodiments in which the frequency down-converted signal produced in step (a) has intermediate (rather than baseband) frequency, further down-conversion of the in-phase and quadrature components (to the baseband frequency) is performed during step (b) prior to generation of the second signal. In preferred embodiments, the first processing operation (of steps (a) and (c)) also accomplishes channel selection. Steps (a) and (b) can be performed either before or after steps (c) and (d), but the analog filter parameters are identical in steps (b) and (d) and the digital filter parameters are identical in steps (b) and (d).

BRIEF DESCRIPTION OF THE DRAWINGS

FIG. 4 is a graph of the pass bands of two elements of the FIG. 2 apparatus (filters 7 and 19), and of the complex frequency spectrum of the output of filter 19, during non-synchronization operation (i.e., other than in a synchronization mode) of the FIG. 2 apparatus. In FIG. 4, distance along the horizontal axis represents increasing real portion of frequency, and distance along the vertical axis represents increasing imaginary portion of frequency.

FIG. 5 is a graph of filter 7's pass band in a variation on the FIG. 2 apparatus (in which a digital filter that corresponds to and replaces filter 19 is controlled so that its pass band is shifted relative to that of filter 7 during a synchronization mode). FIG. 5 also shows the pass band (in the synchronization mode) of such digital filter, and the complex frequency spectrum of the output (during the synchronization mode) of such digital filter.

DETAILED DESCRIPTION OF THE PREFERRED EMBODIMENTS

Figure 2:
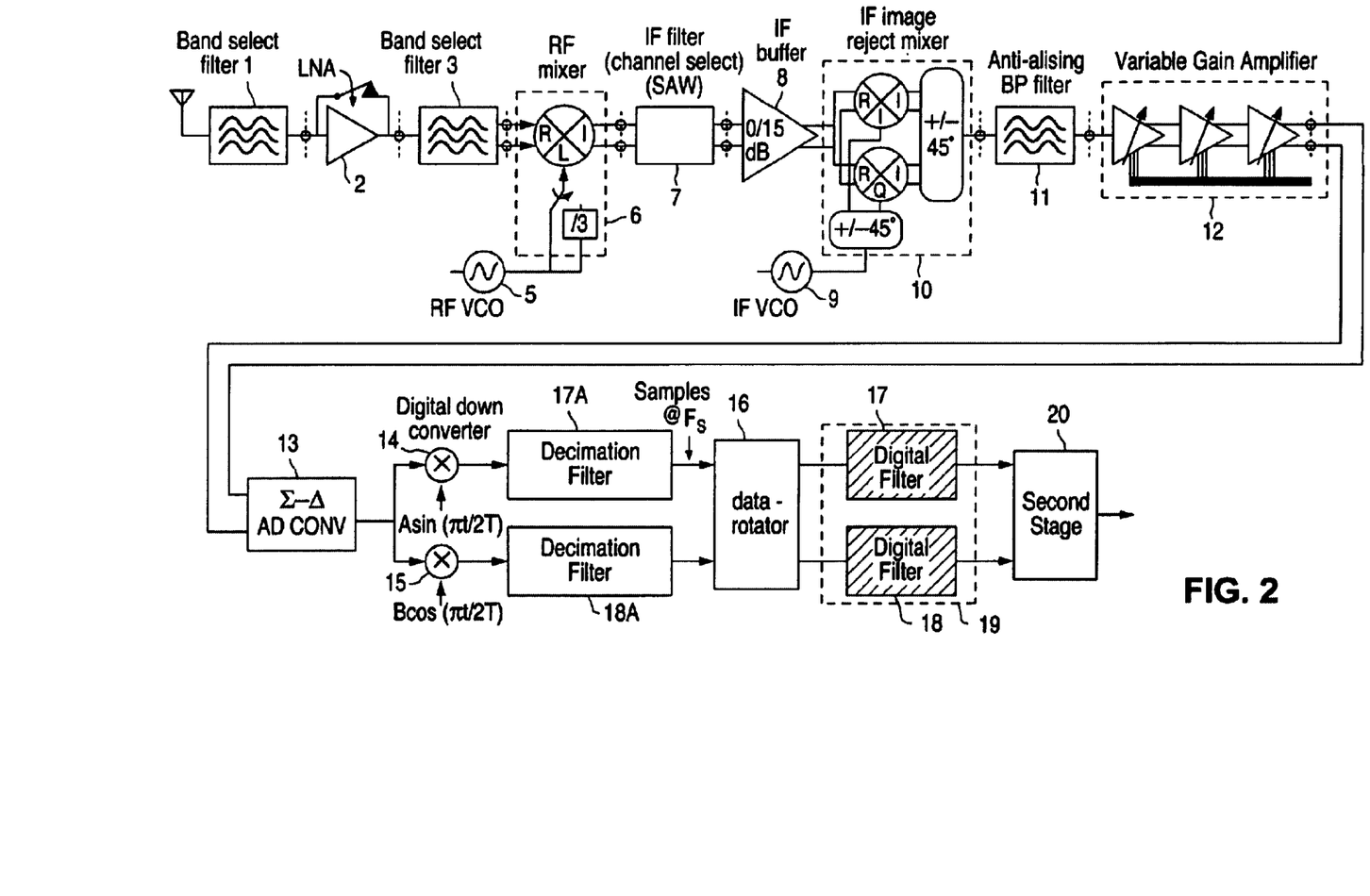
FIG. 2 is a block diagram of a receiver of a GSM wireless communication system, in a preferred embodiment of the invention.

FIG. 2 is a block diagram of a receiver of a GSM wireless communication system, in a preferred embodiment of the invention. The apparatus of FIG. 2 is identical to that of FIG. 1a, except in that in the FIG. 2 apparatus: data rotation circuit 16 is connected between decimation filters 17A and 18A and digital filters 17 and 18; and second stage circuitry 20 (which processes the output of filters 17 and 18) is configured to process the signals resulting from each operating mode of the first stage (which comprises circuit 16 as well as elements 1-3, 5-15, 17, 17A, 18, and 18A). Elements of the FIG. 2 apparatus that correspond (and are identical) to elements of the FIG. 1a apparatus are identified by identical reference numbers in FIGS. 1a and 2, and the description thereof will not be repeated with reference to FIG. 2.

Figure 3:
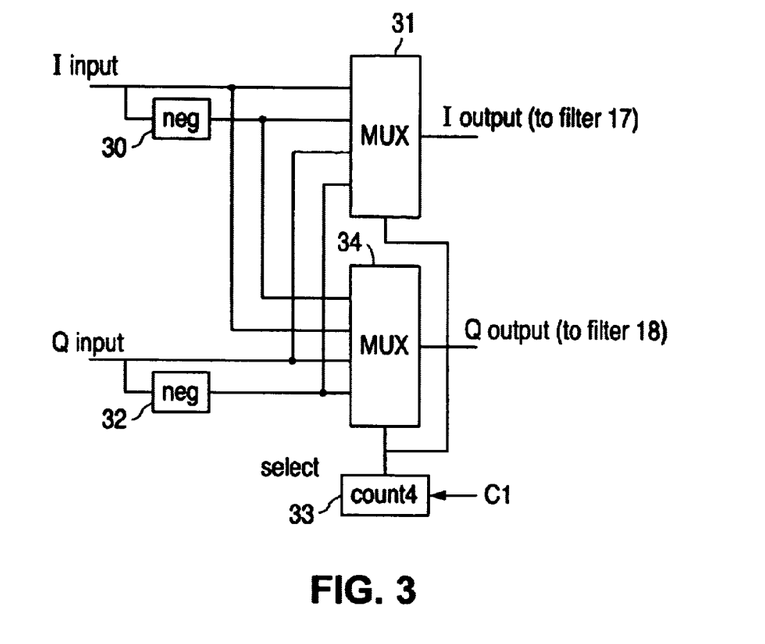
FIG. 3 is a block diagram of a preferred implementation of circuit 16 of the FIG. 2 or FIG. 8 embodiment.

FIG. 3 is a block diagram of a preferred implementation of data rotation circuit 16 of the FIG. 2 embodiment (or the FIG. 8 embodiment to be described below). The circuit of FIG. 3 includes negation circuits 30 and 32, multiplexers 31 and 34, and counter 33, connected as shown. Each of multiplexers 31 and 34 has four inputs and one output, and a different one of these four inputs is asserted at the output in response to each value of the control signal (the signal "Select") it receives from counter 33. Specifically, a first input of multiplexer 31 is coupled to receive the component I (output from mixer 14), a second input of multiplexer 31 is coupled to receive the negative of component I, a third input of multiplexer 31 is coupled to receive the component Q (output from mixer 15), a fourth input of multiplexer 31 is coupled to receive the negative of component Q, a first input of multiplexer 34 is coupled to receive the negative of component I, a second input of multiplexer 34 is coupled to receive component I, a third input of multiplexer 34 is coupled to receive the component Q, and a fourth input of multiplexer 34 is coupled to receive the negative of component Q.

Multiplexers 31 and 34 are controlled by counter 33 as follows. During the synchronization mode (in which control signal C1 has a first value), counter 33 asserts control signal "Select", with a repeating sequence of four values: S1, S2 (which follows S1), S3 (which follows S2), and S4 (which follows S3). The "Select" signal can be a word comprising two binary bits (so that S1, S2, S3, and S4 have the values 00, 01, 10, and 11).

In response to the "Select" signal having the value Si, multiplexer 31 asserts component I at its output and multiplexer 34 asserts component Q at its output. In response to "Select" having the value S2, multiplexer 31 asserts component Q at its output and multiplexer 34 asserts component −I at its output. In response to "Select" having the value S3, multiplexer 31 asserts component −I at its output and multiplexer 34 asserts component −Q at its output. In response to "Select" having the value S4, multiplexer 31 asserts component −Q at its output and multiplexer 34 asserts component I at its output.

Thus, the FIG. 3 circuit rotates the data (in the I-Q plane) so as to effectively shift the frequency of the data down by F/4, where F is the sample rate. In the typical implementation in which the sample rate is 541.7 kilosamples/sec (the frequency of the signal at each input of each of multiplexers 31 and 34 is 67.7 kHz), the frequency of the signal asserted at each output of the FIG. 3 circuit is −67.7 kHz, which translates the signal by F/4=(−135.4 kHz).

Figure 4:
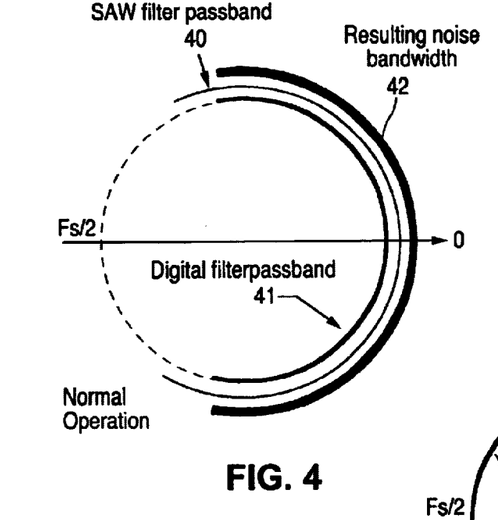
Figure 5:
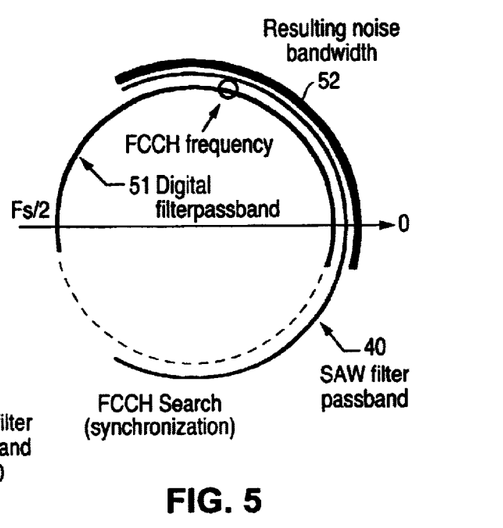
Figure 6:
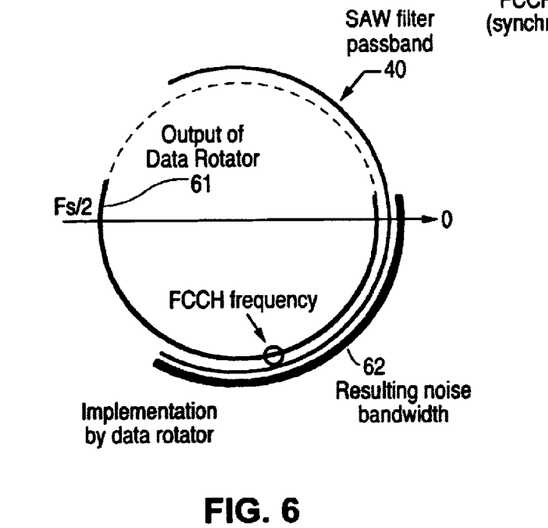
FIG. 6 is a graph of the pass band of filter 7 of the FIG. 2 apparatus, and of the complex frequency spectra of the output of circuit 16 and of filter 19 of the FIG. 2 apparatus, during the synchronization mode of the FIG. 2 apparatus.

To appreciate why this effective frequency shift has the effect of reducing the effective combined pass band of channel select filter 7 and digital lowpass filter 19, it is helpful to compare the graphs shown in FIGS. 4, 5, and 6. In each of FIGS. 4–6, distance along the horizontal axis represents increasing real portion of frequency, and distance along the vertical axis represents increasing imaginary portion of frequency. The symbol $F_s$ denotes the sampling frequency (which is twice the data rate). The standard GSM data rate is 270.8 kb/sec (270.8 kHz).

FIG. 4 is a graph of the pass bands of two elements of the FIG. 2 apparatus (filters 7 and 19), and of the complex frequency spectrum of the output of filter 19, during non-synchronization operation. (i.e., other than in a synchronization mode) of the FIG. 2 apparatus. The pass band identified by reference numeral 40 is that of channel select filter 7. The pass band identified by reference numeral 41 is that of digital filter 19. Note that pass band 40 includes pass band 41, and that pass band 40 is slightly wider than pass band 41. The complex frequency spectrum identified by reference numeral 42 is that of the output of filter 19 during the non-synchronization operation. In FIG. 4, complex frequency spectrum 42 coincides with the combined pass band of filters 7 and 19.

FIG. 5 represents characteristics of a variation on the FIG. 2 apparatus in which a digital lowpass filter that corresponds to (and replaces) filter 19 is controlled so that its pass band is shifted relative to that of filter 7 during the synchronization mode. Such a controllable filter would need to have a more complicated design than would filter 19 of FIG. 2. In FIG. 5, the pass band identified by reference numeral 40 is that of channel select filter 7 in such variation. The pass band identified by reference numeral 51 is that of the digital lowpass filter (which replaces filter 19) during the synchronization mode of such variation. Note that pass band 51 includes the frequency (identified as the "FCCH" frequency) of the frequency correction burst of the received signal. The complex frequency spectrum identified by reference numeral 52 is that of the output of the digital lowpass filter (which replaces filter 19). Frequency spectrum 52 is the portion of pass band 40 which overlaps with pass band 51. Note that spectrum 52 includes the "FCCH" frequency, but that spectrum 52 is substantially narrower than is pass band 51. This is desirable since it implies that the noise bandwidth during synchronization processing is narrower than during other processing modes of the receiver.

FIG. 6 is a graph of pass band 40 of filter 7 of the FIG. 2 apparatus, of complex frequency spectrum 61 of the output of data rotation circuit 16 (during the synchronization mode), and of complex frequency spectrum 62 of the output of digital filter 19 (during the synchronization mode of the FIG. 2 apparatus). Note that in frequency spectrum 61, the FCCH frequency is rotated by half the data rate (consistent with the foregoing explanation of FIG. 3). Frequency spectrum 62 coincides with the combined pass band of filters 7 and 19 during the synchronization mode. Note that spectrum 62 has the same width as does spectrum 52 of FIG. 5, which implies that the FIG. 2 embodiment of the invention achieves the same reduced noise bandwidth (during synchronization processing) as does the apparatus described with reference to FIG. 5, but without increasing the complexity of digital filter 19 (in contrast with the apparatus described with reference to FIG. 5).

With reference again to FIG. 2, it should be appreciated that during the synchronization mode, second stage circuitry 20 performs synchronization processing on the output of filter 19 to enable the FIG. 2 receiver to lock onto the frequency correction burst indicated thereby. In this mode, the output of filter 17 is the real component (and the output of filter 18 is the imaginary component) of a twice filtered, frequency shifted, digitized version of the received signal. Since this signal has been frequency shifted in data rotation circuit 16, second stage circuitry 20 should be configured so as to compensate for the frequency shift.

With reference again to FIG. 3, during each normal operating mode (following the synchronization mode), control signal C1 has a second value which causes counter 33 to assert the Select signal with the constant value S1, so that multiplexer 31 asserts component I at its output and multiplexer 34 asserts component Q at its output. Thus, data rotation circuit 16 does not implement data rotation during such normal (non-synchronization) operation. During each normal operating mode of the FIG. 2 apparatus (i.e., during each mode following the synchronization mode), second stage circuitry 20 performs in the same manner as would the second stage circuitry which processes the output of filter 19 in the FIG. 1 apparatus.

Figure 8:
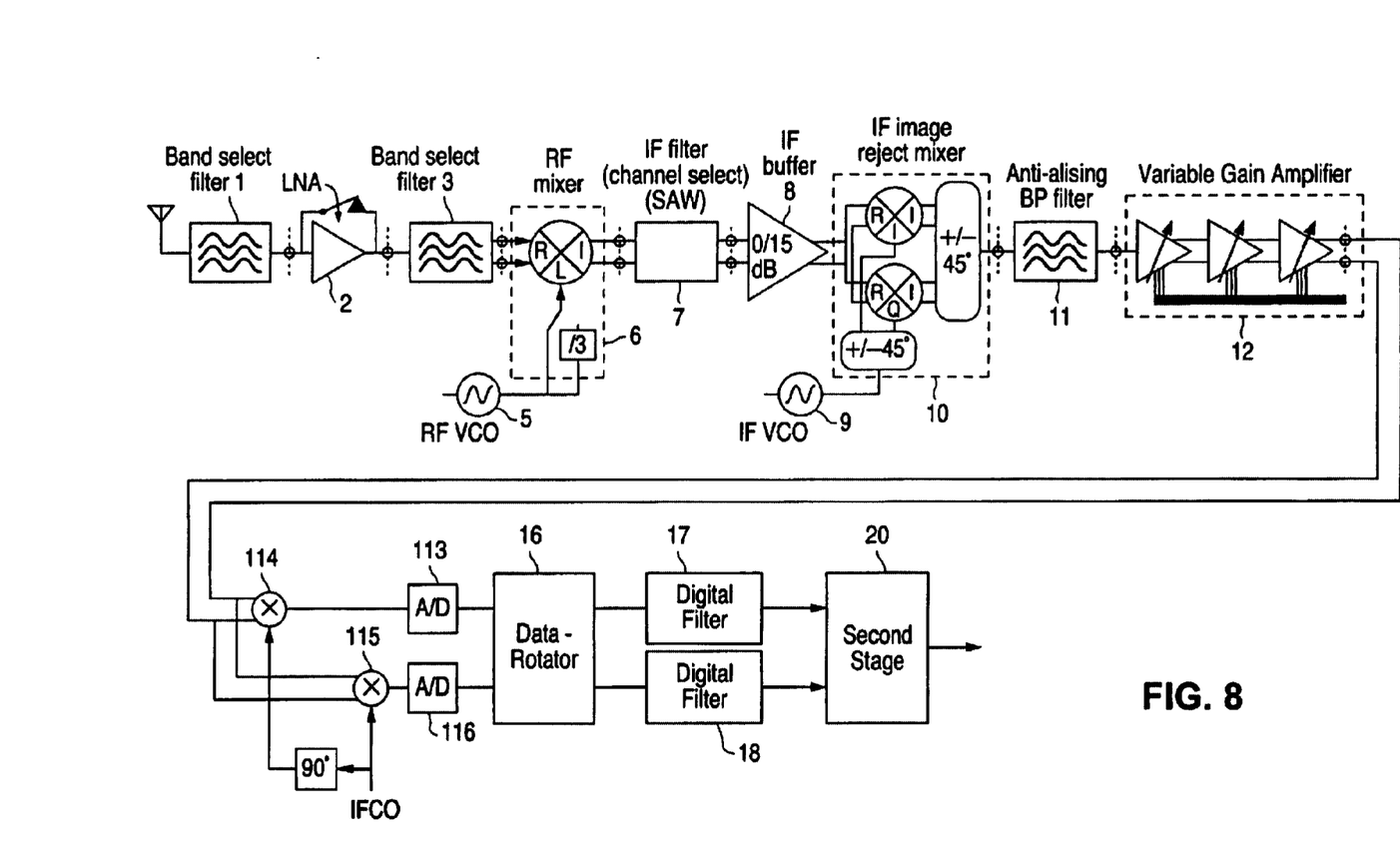
FIG. 8 is a block diagram of a portion of a receiver of a GSM wireless communication system designed in accordance with another preferred embodiment of the invention.

FIG. 8 is a block diagram of a receiver of a GSM wireless communication system, in another preferred embodiment of the invention. The apparatus of FIG. 8 is identical to that of FIG. 1b, except in that: in the FIG. 8 apparatus data rotation circuit 16 is connected between analog-to-digital converters 113 and 116 and digital filters 17 and 18; and second stage circuitry 20 (which processes the output of filters 17 and 18) is configured to process the signals resulting from each operating mode of the first stage (the first stage comprises circuit 16 as well as elements 1-3, 5-12, 113, 114, 115, 116, 17, and 18). Elements of the FIG. 8 apparatus that correspond (and are identical) to elements of the FIG. 1b apparatus are identified by identical reference numbers in FIGS. 1b and 8, and the description thereof will not be repeated with reference to FIG. 8.

Figure 9:
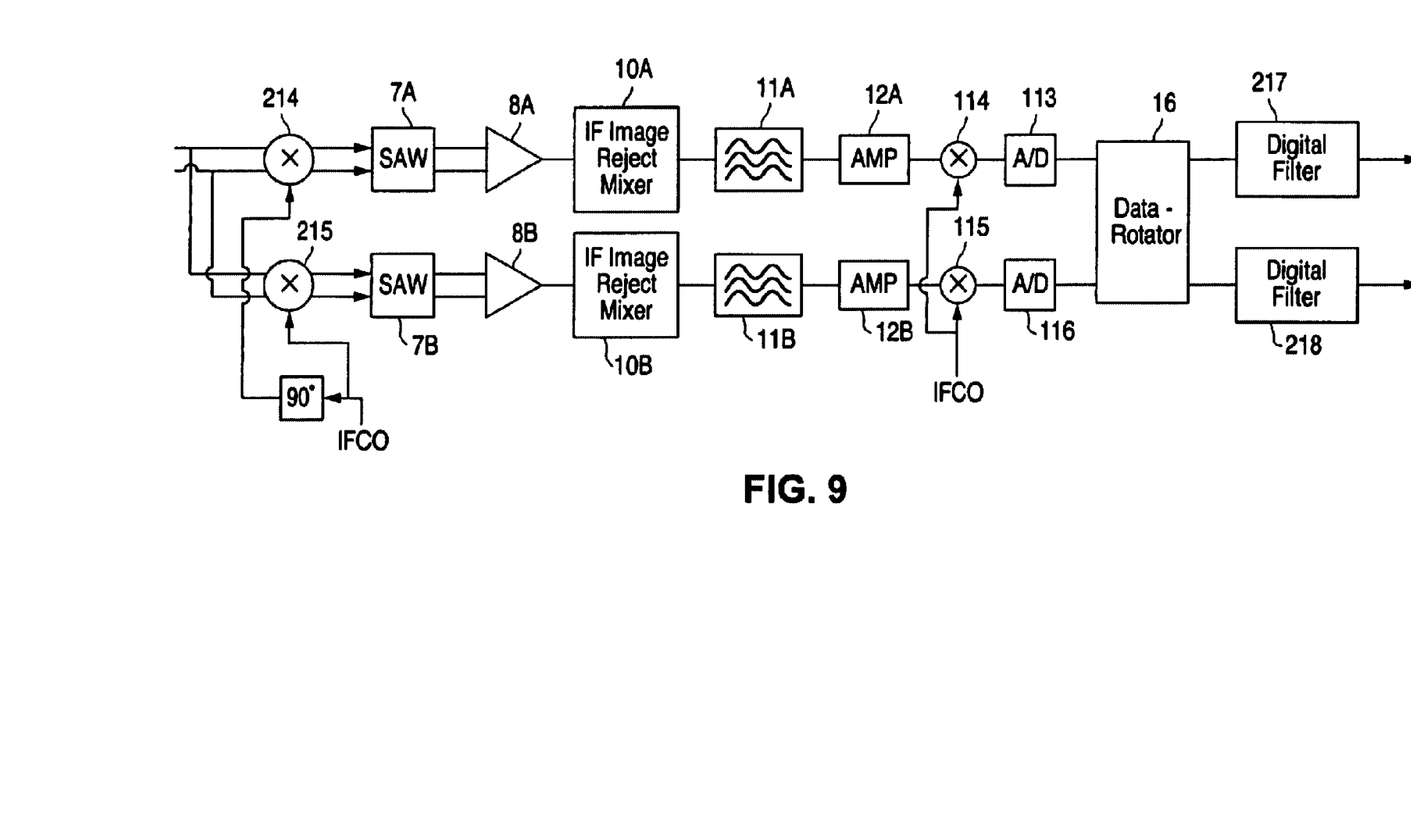
FIG. 9 is a block diagram of a portion of another embodiment of a receiver of a GSM wireless communication system designed in accordance with the invention.

FIG. 9 is a block diagram of a portion of a receiver of a GSM wireless communication system designed in accordance with another embodiment of the invention. Each of mixers 214 and 215 of FIG. 9 receives the output of an RF mixer such as RF mixer 6 of FIG. 8 (elements 1, 2, 3, 5, and 6 of FIG. 8 would typically be included in the FIG. 9 apparatus). The signals output from mixers 214 and 215 are, respectively, an in-phase component I and a quadrature component Q, of an intermediate frequency analog signal. These components are respectively bandpass filtered in channel select filters 7A and 7B (each of which filters is identical to filter 7 of FIG. 8). The I and Q components output from filters 7A and 7B are respectively amplified in IF buffer amplifiers 8A and 8B (each of which is identical to amplifier 8 of FIG. 8), and then respectively undergo IF image rejection processing in mixers 10A and 10B (each of which is identical to mixer 10 of FIG. 8) and bandpass filtering (for anti-aliasing) in bandpass filters 11A and 11B (each of which is identical to bandpass filter 11). The I and Q components output from filters 11A and 11B are amplified respectively in variable gain amplifiers 12A and 12B (each of which is identical to variable gain amplifier 12), and then frequency down-converted respectively in mixers 114 and 115 (which are identical to mixers 114 and 115 of FIG. 8 but are driven by the same clock; not two out-of-phase clocks as are mixers 114 and 115 of FIG. 8). The I and Q components output from mixers 114 and 115 are digitized respectively in analog-to-digital converters 113 and 116 (which are identical to converters 113 and 116 of FIG. 8), and undergo data rotation in data rotation circuit 16 (identical to circuit 16 of FIG. 8) and then filtering in digital filters 217 and 218. Digital filters 217 and 218 perform the low-pass filtering function implemented by filters 17 and 18 of FIG. 8, and can be identical to digital filters 17 and 18 of FIG. 8.

In preferred embodiments of the invention, data (determined by a signal that has been bandpass-filtered in a channel select filter and then digitized) is rotated to reduce the effective combined pass band of the channel select filter and a digital filter. In alternative embodiments, the effective combined pass band of such a channel select filter and such a digital filter is reduced by performing another type of processing operation on a signal that has been bandpass-filtered in the channel select filter (and typically also digitized after being so bandpass filtered). For example, to perform such an alternative processing operation, a selectively activatable lowpass (or bandpass) filter could be coupled between the channel select filter and the digital filter. Such selectively activatable lowpass (or bandpass) filter would be activated during the synchronization mode, but would otherwise be deactivated (i.e., effectively replaced by a short circuit between each input and each output thereof).

Figure 7:
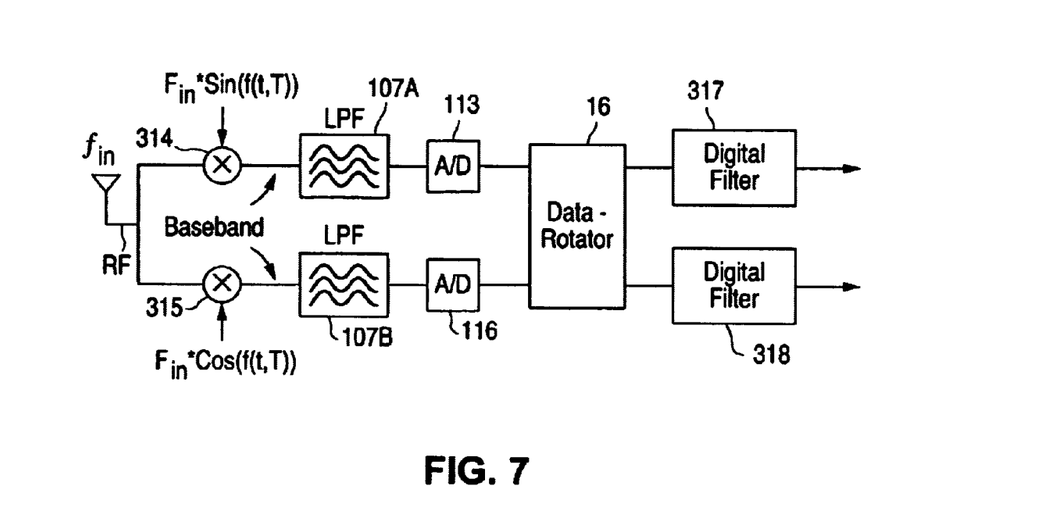
FIG. 7 is a block diagram of a portion of a receiver of a GSM wireless communication system designed in accordance with another preferred embodiment of the invention.

FIG. 7 is a block diagram of the first stage of a receiver (designed in accordance with another preferred embodiment of the invention) which performs immediate down-conversion of the received signal to the baseband frequency (in mixers 314 and 315), rather than down-conversion to an intermediate frequency (e.g., as in mixers 214 and 215 of FIG. 9) followed by down-conversion from the intermediate frequency to the baseband frequency (as in FIG. 9, following amplification in amplifiers 12A and 12B). Mixers 314 and 315 of FIG. 7 also accomplish channel selection. Each of mixers 314 and 315 receives the RF signal received by the receiver, and the signals output from mixers 314 and 315 are, respectively, an in-phase component I and a quadrature component Q, of a baseband frequency analog signal. These components are respectively filtered in analog low pass filters 107A and 107B. The I and Q components output from filters 107A and 107B (optionally after amplification by amplifiers not shown and additional analog filtering by filters not shown) are digitized respectively in analog-to-digital converters 113 and 116 (which are identical to converters 113 and 116 of FIG. 8), then undergo data rotation in data rotation circuit 16 (identical to circuit 16 of FIG. 8), and are then filtered in digital filters 317 and 318. Digital filters 317 and 318 perform a lowpass (or bandpass) filtering function, and optionally also any other functions implemented by filters 17 and 18 of FIG. 8 (or filters 217 and 218 of FIG. 9). Elements 107A, 107B, 314, and 315 together comprise an analog filter. This analog filter, and the digital filter comprising elements 317 and 318, together have a combined passband. This combined passband is narrower in the synchronization mode of the receiver (in which element 16 rotates the data of the digitized signal which appears at its inputs) than in other operating modes of the receiver (in which element 16 passes through unmodified the digitized signal which appears at its inputs). The outputs of the digital filter comprising elements 317 and 318 are coupled to second stage circuitry of the receiver (such as second stage circuitry 20 of FIG. 2).

Another aspect of the invention is a method for processing a signal that has propagated over a wireless communication link using a system having a first stage (including an analog filter and a digital filter) and a second stage, wherein the first stage provides a twice filtered signal (which has undergone filtering in both the analog filter and digital filter) to the second stage, and the second stage performs a sequence of operations on different portions of the twice filtered signal (e.g., a first operation on a portion of the twice filtered signal generated during a first time interval, and a second operation on a portion of the twice filtered signal generated during a later time interval). The analog filter (which can be an analog channel select filter) and the digital filter together have a combined pass band (e.g., the analog filter is a low pass or bandpass filter, the digital filter is a low pass or bandpass filter, and the analog and digital filters together have a pass band referred to as the "combined pass band"). In some embodiments, the method includes the steps of: (a) filtering a portion of the signal in the analog filter to generate a portion of a filtered signal, digitizing the portion of the filtered signal to produce a portion of a digitized filtered signal having in-phase and quadrature components, digitally processing the portion of the digitized filtered signal to generate a portion of a second signal, filtering the portion of the second signal in the digital filter to produce a portion of the twice filtered signal having a first noise bandwidth, and performing one of the operations in the second stage on said portion of the twice filtered signal; and (b) filtering a different portion of the signal in the analog filter to generate a different portion of the filtered signal, digitizing the different portion of the filtered signal to generate a different portion of the digitized filtered signal, filtering the different portion of the digitized filtered signal in the digital filter to produce a different portion of the twice filtered signal having a second noise bandwidth which is wider than the first noise bandwidth. Step (b) can be performed either before or after step (a), but the parameters of the analog filter are identical in steps (a) and (b) and the parameters of the digital filter are identical in steps (a) and (b). Preferably, the digital processing performed (on the digitized filtered signal) in step (a) is a data rotation operation.

In other embodiments, the method includes the steps of: (a) performing one of the operations in the second stage on a first portion of the twice filtered signal contemporaneously with filtering a portion of the signal in the analog filter to generate a filtered signal, digitizing said portion of the filtered signal to generate a portion of a digitized filtered signal, digitally processing the portion of the digitized filtered signal to generate a portion of a second filtered signal, and filtering the portion of the second filtered signal in the digital filter to produce a portion of the twice filtered signal having a first noise bandwidth; and (b) performing another one of the operations in the second stage on the twice filtered signal contemporaneously with filtering a different portion of the received signal in the analog filter to generate a different portion of the filtered signal, digitizing the different portion of the filtered signal to generate a different portion of the digitized filtered signal, and filtering the different portion of the digitized filtered signal in the digital filter to produce a different portion of the twice filtered signal having a second noise bandwidth which is wider than the first noise bandwidth. Step (b) can be performed either before or after step (a), but the parameters of the analog filter are identical in steps (a) and (b) and the parameters of the digital filter are identical in steps (a) and (b).

In another class of embodiments, the method includes the steps of: (a) performing a first processing operation on a portion of the signal to generate a portion of a frequency down-converted signal having in-phase and quadrature components (this step can include immediate down conversion to a baseband frequency, or down conversion to an intermediate frequency); (b) filtering a portion of the frequency down-converted signal in an analog filter to generate a portion of a filtered signal, digitizing the portion of the filtered signal to generate a portion of a digitized filtered signal, digitally processing the portion of the digitized filtered signal to generate a portion of a second signal, and filtering the portion of the second signal in the digital filter to generate a portion of the twice filtered signal having a first noise bandwidth, and performing one of the operations on said portion of the twice filtered signal in the second stage; (c) performing the first processing operation on a different portion of the signal to generate a different portion of the frequency down-converted signal; and (d) filtering a different portion of the frequency down-converted signal in the analog filter to generate a different portion of the filtered signal, digitizing the different portion of the filtered signal to generate a different portion of the digitized filtered signal, and filtering the different portion of the digitized filtered signal in the digital filter to generate a different portion of the twice filtered signal having a second noise bandwidth which is wider than the first noise bandwidth, and performing another one of the operations on said different portion of the twice filtered signal in the second stage. In embodiments in which the frequency down-converted signal produced in step (a) has intermediate (rather than baseband) frequency, further down-conversion of the in-phase and quadrature components (to the baseband frequency) is performed during step (b) prior to generation of the second signal. Steps (a) and (b) can be performed either before or after steps (c) and (d), but the analog filter parameters are identical in steps (b) and (d) and the digital filter parameters are identical in steps (b) and (d).

It should be understood that various other alternatives to the embodiments of the invention described herein may be employed in practicing the invention. It is intended that the following claims define the scope of the invention and that structures and methods within the scope of these claims and their equivalents be covered thereby.

What is claimed is:

1. A wireless communication system receiver, including:
   a first stage, coupled to receive a transmitted signal and configured to produce an output signal in response to the transmitted signal; and
   a second stage coupled to receive the output signal and configured to perform a sequence of processing operations on the output signal, at least one of the processing operations performed on a different frequency band of the output signal than another of the processing operations, wherein the first stage includes:
   bandwidth control circuitry operable in a first mode during performance of the at least one of the processing operations, and in a second mode during performance of said another of the processing operations, wherein the bandwidth control circuitry allows the first stage to produce the output signal with a first bandwidth in the second mode, and the bandwidth control circuitry causes the first stage to produce the output signal with a second bandwidth narrower than the first bandwidth in the first mode, wherein the first stage also includes an analog filter, a digital filter, and an analog-to-digital converter coupled between the analog filter and the digital filter, wherein the analog-to-digital converter produces a digitized signal indicative of data, and
   wherein the bandwidth control circuitry is a data rotation circuit coupled between the analog-to-digital converter and the digital filter, the data rotation circuit being configured to rotate the data during the first mode.

2. The receiver of claim 1, wherein the receiver is a GSM receiver, and said at least one of the processing operations is a synchronization operation.

3. The receiver of claim 1, wherein the analog filter is a channel select bandpass filter, and the digital filter is a digital lowpass filter.

4. The receiver of claim 1, wherein the analog filter is a channel select filter, and the digital filter is a digital lowpass filter.

5. The receiver of claim 4, wherein the first stage also includes:
   mixing circuitry coupled between the channel select filter and the analog-to-digital converter, wherein the mixing circuitry receives a filtered analog signal and is configured to assert a complex analog signal having an analog in-phase component and an analog quadrature component in response to the filtered analog signal, wherein the analog-to-digital converter includes an in-phase component converter which receives the analog in-phase component and asserts an in-phase component of the digitized signal in response thereto, and wherein the analog-to-digital converter includes a quadrature component converter which receives the analog quadrature component and asserts a quadrature component of the digitized signal in response thereto, wherein the in-phase component of the digitized signal and the quadrature component of the digitized signal together are indicative of the data,
   wherein the data rotation circuit includes multiplexers coupled to receive the in-phase component of the digitized signal and the quadrature component of the digitized signal.

6. The receiver of claim 4, wherein the first stage also includes:
   mixing circuitry coupled between the analog-to-digital converter and the bandwidth control circuitry, wherein the mixing circuitry receives the digitized signal and is configured to assert a complex digital signal indicative of the data in response to the digitized signal, said complex digital signal having in-phase and quadrature components, and
   wherein the data rotation circuit includes multiplexers coupled to receive the in-phase and quadrature components of the complex digital signal.

7. A wireless communication system receiver, including:
   a first stage, coupled to receive a transmitted signal and configured to produce an output signal in response to the transmitted signal; and
   a second stage coupled to receive the output signal and configured to perform a sequence of processing operations on the output signal, at least one of the processing operations performed on a different frequency band of the output signal than another of the processing operations, wherein the first stage includes:
   bandwidth control circuitry operable in a first mode during performance of the at least one of the processing operations, and in a second mode during performance of said another of the processing operations, wherein the bandwidth control circuitry allows the first stage to produce the output signal with a first bandwidth in the second mode, and the bandwidth control circuitry causes the first stage to produce the output signal with a second bandwidth narrower than the first bandwidth in the first mode, wherein the first stage also includes first circuitry including an analog filter, and second circuitry coupled to the first circuitry and including an analog-to-digital converter, and wherein the bandwidth control circuitry is coupled to the second circuitry and includes a digital filter configured to generate the output signal, wherein the first circuitry includes:

mixing circuitry coupled to receive the transmitted signal and configured to assert a complex baseband signal having an analog in-phase component and an analog quadrature component in response to the transmitted signal, wherein the analog filter includes an in-phase component filter which receives the analog in-phase component and asserts a filtered in-phase component in response thereto, and a quadrature component filter which receives the analog quadrature component and asserts a filtered quadrature component in response thereto, and wherein the second circuitry is coupled to receive the filtered in-phase component and the filtered quadrature component, wherein the analog-to-digital converter is configured to produce a digitized signal indicative of data, wherein the bandwidth control circuitry includes a data rotation circuit coupled between the analog-to-digital converter and the digital filter, the data rotation circuit being configured to rotate the data during the first mode, and wherein the analog-to-digital converter includes:

an in-phase component converter which receives the filtered in-phase component and asserts an in-phase component of the digitized signal in response thereto; and a quadrature component converter which receives the filtered quadrature component and asserts a quadrature component of the digitized signal in response thereto, wherein the in-phase component of the digitized signal and the quadrature component of the digitized signal together are indicative of the data.

8. The receiver of claim 7, wherein the analog filter is a channel select filter.

9. The receiver of claim 7, wherein the receiver is a GSM receiver, and said at least one of the processing operations is a synchronization operation.

10. A wireless communication system receiver, including:

a first stage, coupled to receive a transmitted signal and configured to produce an output signal in response to the transmitted signal; and a second stage coupled to receive the output signal and configured to perform a sequence of processing operations on the output signal, at least one of the processing operations performed on a different frequency band of the output signal than another of the processing operations, wherein the first stage includes:

bandwidth control circuitry operable in a first mode during performance of the at least one of the processing operations, and in a second mode during performance of said another of the processing operations, wherein the bandwidth control circuitry allows the first stage to produce the output signal with a first bandwidth in the second mode, and the bandwidth control circuitry causes the first stage to produce the output signal with a second bandwidth narrower than the first bandwidth in the first mode, wherein the first stage also includes first circuitry including an analog filter, and second circuitry coupled to the first circuitry and including an analog-to-digital converter, and wherein the bandwidth control circuitry is coupled to the second circuitry and includes a digital filter configured to generate the output signal, and wherein the first circuitry generates a first stage signal and said first circuitry includes:

mixing circuitry coupled to receive the transmitted signal and configured to assert a complex intermediate frequency signal having an analog in-phase component and an analog quadrature component in response to the transmitted signal, wherein the analog filter includes an in-phase component filter which receives the analog in-phase component and asserts a filtered in-phase component in response thereto, and a quadrature component filter which receives the analog quadrature component and asserts a filtered quadrature component in response thereto, and wherein the first stage signal is generated in response to the filtered in-phase component and the filtered quadrature component; and wherein the second circuitry includes:

additional mixing circuitry coupled to receive the first stage signal and configured to assert a complex baseband frequency signal in response to said first stage signal, wherein the analog-to-digital converter of the second circuitry is coupled to receive the complex baseband frequency signal.

11. A wireless communication system receiver having a first stage which produces an output signal in response to a transmitted signal, and a second stage coupled to receive the output signal and which performs a sequence of processing operations on the output signal, at least one of the processing operations being performed on a different frequency band of the output signal than another of the processing operations, wherein the first stage includes:

first circuitry, coupled to receive the transmitted signal and including a channel select bandpass filter, wherein the first circuitry produces a bandpass-filtered signal in response to the transmitted signal;

second circuitry, coupled to receive the bandpass-filtered signal and including an analog-to-digital converter, wherein the second circuitry produces a digitized signal in response to the bandpass-filtered signal;

bandwidth control circuitry, coupled to receive the digitized signal and configured to produce a bandwidth control output signal in response to the digitized signal; and a digital lowpass filter coupled to receive the bandwidth control output signal and configured to produce a twice filtered signal in response to the bandwidth control output signal, wherein the bandwidth control circuitry is operable in a first mode during performance of at least one of the processing operations, and in a second mode during performance of said another of the processing operations, wherein the bandwidth control circuitry is configured to produce the bandwidth control output signal in the second mode such that the twice filtered signal has a first bandwidth, and the bandwidth control circuitry is configured to produce the bandwidth control output signal in the first mode such that the twice filtered signal has a second bandwidth narrower than the first bandwidth.

12. The receiver of claim 11, wherein the digitized signal is indicative of data, and the bandwidth control circuitry is a data rotation circuit configured to rotate the data during the first mode.

13. The receiver of claim 12, wherein the analog-to-digital converter produces the digitized signal and the second circuitry includes:

mixing circuitry coupled between the analog-to-digital converter and the bandwidth control circuitry, wherein the mixing circuitry is configured to produce a digital signal in response to the digitized signal such that the digital signal is a complex digital signal having in-phase and quadrature components, and wherein the data rotation circuit includes multiplexers coupled to receive the in-phase and quadrature components of the digital signal.

14. The receiver of claim 12, wherein the receiver is a GSM receiver, and said at least one of the processing operations is a synchronization operation.

15. A GSM receiver having a first stage and a second stage, wherein the first stage produces an output signal in response to a transmitted signal indicative of data, and the second stage is coupled to receive the output signal and configured to perform a sequence of processing operations on the output signal including a synchronization operation on a first frequency band of the output signal and at least one other operation that is performed on a second frequency band of the output signal, where the second frequency band is wider than the first frequency band, wherein the first stage includes:

first circuitry, coupled to receive the transmitted signal and including a channel select filter, wherein the first circuitry produces a filtered signal in response to the transmitted signal;

second circuitry, coupled to receive the filtered signal and including an analog-to-digital converter configured to produce a digitized signal indicative of the data and having a data rate, and mixing circuitry coupled to the analog-to-digital converter and configured to produce a complex digital signal in response to the digitized signal, wherein the complex digital signal is indicative of the data and has in-phase and quadrature components;

a data rotation circuit, coupled to receive the complex digital signal and configured to produce a data rotation circuit output signal in response to the complex digital signal; and a digital lowpass filter coupled to receive the data rotation circuit output signal and configured to produce a twice filtered signal in response to the data rotation circuit output signal, wherein the data rotation circuit is operable in a first mode during performance of the synchronization operation, and in a second mode during performance of the at least one other operation, and the data rotation circuit rotates the data during the first mode but not the second mode, whereby the data rotation circuit allows the first stage to produce the output signal with a first bandwidth in the second mode, and the data rotation circuit causes the first stage to produce the output signal with a second bandwidth narrower than the first bandwidth in the first mode.

16. The receiver of claim 15, wherein the data rotation circuit includes:

A negation circuitry configured to produce a negated in-phase component in response to the in-phase component of the complex digital signal and a negated quadrature component in response to the quadrature component of the complex digital signal; and a set of multiplexers, each coupled to receive the in-phase and quadrature components of the complex digital signal, the negated in-phase component, and the negated quadrature component; and a control circuit coupled to the multiplexers and configured to assert at least one control signal to the multiplexers, wherein said at least one control signal has a repeating sequence of control signal values in the first mode.

17. The receiver of claim 16, wherein the multiplexers assert in-phase and quadrature components of the data rotation circuit output signal during the first mode, said in-phase and quadrature components of the data rotation circuit output signal being indicative of the data but having a frequency lower than the data rate.

18. The receiver of claim 15, wherein the channel select filter is a channel select bandpass filter and the filtered signal is a band-pass filtered signal.

19. A method for operating a receiver to process a signal that has propagated over a wireless communication link, wherein the receiver has a first stage and a second stage, the first stage includes an analog filter and a digital filter, the first stage provides a twice filtered signal which has undergone filtering in the analog filter and the X digital filter to the second stage, and the second stage performs a sequence of operations on different portions of the twice filtered signal, said method including the steps of:

(a) filtering a portion of the signal in the analog filter to generate a portion of a filtered signal, digitizing the portion of the filtered signal to produce a portion of a digitized filtered signal having in-phase and quadrature components, digitally processing the portion of the digitized filtered signal to generate a portion of a digitally processed signal, filtering the portion of the digitally processed signal in the digital filter to produce a portion of the twice filtered signal having a first noise bandwidth, and performing one of the operations in the second stage on said portion of the twice filtered signal; and (b) filtering a different portion of the signal in the analog filter to generate a different portion of the filtered signal, digitizing the different portion of the filtered signal to generate a different portion of the digitized filtered signal, filtering the different portion of the digitized filtered signal in the digital filter to produce a different portion of the twice filtered signal having a second noise bandwidth which is wider than the first noise bandwidth.

20. The method of claim 19, wherein the analog filter is a channel select band-pass filter, the filtered signal is a band-pass filtered signal, and step (a) includes the step of filtering said portion of the signal in the channel select band-pass filter to generate said portion of the filtered signal.

21. The method of claim 19, wherein said one of the operations is a synchronization operation and step (b) is performed after step (a).

22. The method of claim 19, wherein the digitized filtered signal is indicative of data having a data rate, and the step of digitally processing the portion of the digitized filtered signal to generate the portion of the digitally processed signal accomplishes rotation of the data.

23. The method of claim 22, wherein the step of digitally processing the portion of the digitized filtered signal to generate the portion of the digitally processed signal includes the steps of:

negating the in-phase and quadrature components to generate negated in-phase and quadrature components; and performing time-division multiplexing on the in-phase and quadrature components and the negated in-phase and quadrature components in response to a repeating sequence of control signal values.

24. The method of claim 19, wherein the digitized filtered signal is indicative of data having a data rate, and the step of digitally processing the portion of the digitized filtered signal to generate the portion of the digitally processed signal includes the step of generating in-phase and quadrature components of the digitally processed signal which are indicative of the data but have a frequency lower than the data rate.

25. The method of claim 19, wherein said one of the operations is a synchronization operation, step (b) is performed after step (a), the analog filter is an analog channel select bandpass filter and the digital filter is a lowpass filter.

26. A method for operating a receiver to process a signal that has propagated over a wireless communication link, wherein the receiver has a first stage and a second stage, the first stage includes an analog filter and a digital filter, the first stage provides a twice filtered signal which has undergone filtering in the analog filter and the digital filter to the second stage, and the second stage performs a sequence of operations on different portions of the twice filtered signal, said method including the steps of:
 (a) performing one of the operations in the second stage on a first portion of the twice filtered signal contemporaneously with filtering a portion of the signal in the analog filter to generate a portion of a filtered signal, digitizing said portion of the filtered signal to generate a portion of a digitized filtered signal, digitally processing the portion of the digitized filtered signal to generate a portion of a processed signal, and filtering the portion of the processed signal in the digital filter to produce a portion of the twice filtered signal having a first noise bandwidth; and
 (b) performing another one of the operations in the second stage on a second portion of the twice filtered signal contemporaneously with filtering a different portion of the signal in the analog filter to generate a different portion of the filtered signal, digitizing the different portion of the filtered signal to generate a different portion of the digitized filtered signal, and filtering the different portion of the digitized filtered signal in the digital filter to produce a different portion of the twice filtered signal having a second noise bandwidth which is wider than the first noise bandwidth.

27. The method of claim 26, wherein the analog filter is a channel select band-pass filter, the filtered signal is a band-pass filtered signal, and step (a) includes the step of filtering said portion of the signal in the channel select band-pass filter to generate said portion of the filtered signal.

28. The method of claim 27, wherein said one of the operations is a synchronization operation and step (b) is performed after step (a).

29. The method of claim 27, wherein the digitized filtered signal is indicative of data having a data rate, and the step of digitally processing the portion of the digitized filtered signal to generate the portion of the processed signal accomplishes rotation of the data.

30. A method for operating a receiver to process a signal that has propagated over a wireless communication link, wherein the receiver has a first stage and a second stage, the first stage includes an analog filter and a digital filter, the analog filter and the digital filter have a combined pass band, the first stage provides a twice filtered signal which has undergone filtering in the analog filter and the digital filter to the second stage, and the second stage performs a sequence of operations on different portions of the twice filtered signal, said method including the steps of:
 (a) performing a first processing operation on a portion of the signal to generate a portion of a frequency down-converted signal having an in-phase component and a quadrature component;
 (b) filtering the portion of the frequency down-converted signal in the analog filter to generate a portion of a filtered signal, digitizing the portion of the filtered signal to generate a portion of a digitized filtered signal, digitally processing the portion of the digitized filtered signal to generate a portion of a digitally processed signal, and filtering the portion of the digitally processed signal in the digital filter to generate a portion of the twice filtered signal having a first noise bandwidth, and performing one of the operations on said portion of the twice filtered signal in the second stage;
 (c) performing the first processing operation on a different portion of the signal to generate a different portion of the frequency down-converted signal; and
 (d) filtering the different portion of the frequency down-converted signal in the , analog filter to generate a different portion of the filtered signal, digitizing the different i portion of the filtered signal to generate a different portion of a digitized filtered signal, and filtering the different portion of the digitized filtered signal in the digital filter to generate a different portion of the twice filtered signal having a second noise bandwidth which is wider than the first noise bandwidth, and performing another one of the operations on said different portion of the twice filtered signal in the second stage.

31. The method of claim 30, wherein the frequency down-converted signal generated in step (a) is a baseband frequency signal.

32. The method of claim 30, wherein said one of the operations is a synchronization operation, and steps (a) and (b) are performed before steps (c) and (d).

33. The method of claim 30, wherein said one of the operations is a synchronization operation, and steps (c) and (d) are performed before steps (a) and (b).

34. The method of claim 30, wherein the digitized filtered signal is indicative of data having a data rate, and the step digitally processing said portion of the digitized filtered signal to generate said portion of the digitally processed signal accomplishes rotation of the data.

35. A method for operating a receiver to process a signal that has propagated over a wireless communication link, wherein the receiver has a first stage and a second stage, the first stage includes a channel select filter and a digital filter, the channel select filter and the digital filter have a combined pass band, the first stage provides a twice filtered signal which has undergone filtering in the channel select filter and the digital filter to the second stage, and the second stage performs a sequence of operations on different portions of the twice filtered signal, said method including the steps of:
 (a) performing a first processing operation on a portion of the signal to generate a portion of an intermediate frequency down-converted signal having an in-phase component and a quadrature component;
 (b) filtering the portion of the intermediate frequency down-converted signal in the channel select filter to generate a portion of a filtered signal, performing a second processing operation on said portion of the filtered signal to generate a portion of a baseband frequency down-converted signal having an in-phase component and a quadrature component; digitizing the portion of the baseband frequency down-converted signal to generate a portion of a digitized filtered signal, digitally processing the portion of the digitized filtered signal to generate a portion of a digitally processed signal, and filtering the portion of the digitally processed signal in the digital filter to generate a portion of the twice filtered signal having a first noise bandwidth, and performing one of the operations on said portion of the twice filtered signal in the second stage;
 (c) performing the first processing operation on a different portion of the signal to generate a different portion of the intermediate frequency down-converted signal; and (d) filtering the different portion of the intermediate frequency down-converted signal in the channel select filter to generate a different portion of the filtered signal, performing the second processing operation on said different portion of the filtered signal to generate a different portion of the baseband frequency down-converted signal, digitizing the different portion of the baseband frequency down-converted signal to generate a different portion of the digitized filtered signal, and filtering the different portion of the digitized filtered signal in the digital filter to generate a different portion of the twice filtered signal having a second noise bandwidth which is wider than the first noise bandwidth, and performing another one of the operations on said different portion of the twice filtered signal in the second stage.

36. The method of claim 35, wherein said one of the operations is a synchronization operation, and steps (a) and (b) are performed before steps (c) and (d).

37. The method of claim 35, wherein said one of the operations is a synchronization operation, and steps (c) and (d) are performed before steps (a) and (b).

38. The method of claim 35, wherein the digitized filtered signal is indicative of data having a data rate, and the step of digitally processing said portion of the digitized filtered signal to generate said portion of the digitally processed signal accomplishes rotation of the data.

\* \* \* \* \*

UNITED STATES PATENT AND TRADEMARK OFFICE
CERTIFICATE OF CORRECTION

PATENT NO. : 6,683,919 B1
DATED : January 27, 2004
INVENTOR(S) : Christian Volf Olgaard et al.

It is certified that error appears in the above-identified patent and that said Letters Patent is hereby corrected as shown below:

Column 17,
Line 52, "A negation" should be -- negation --.

Column 18,
Line 13, "the X digital" should be -- the digital --.

Column 20,
Line 11, "the , analog" should be -- the analog --.
Line 13, "different i portion" should be -- different portion --.

Signed and Sealed this

Sixteenth Day of March, 2004

JON W. DUDAS
*Acting Director of the United States Patent and Trademark Office*